(No Model.) 2 Sheets—Sheet 1.
C. KRAMER.
VELOCIPEDE.
No. 361,530. Patented Apr. 19, 1887.
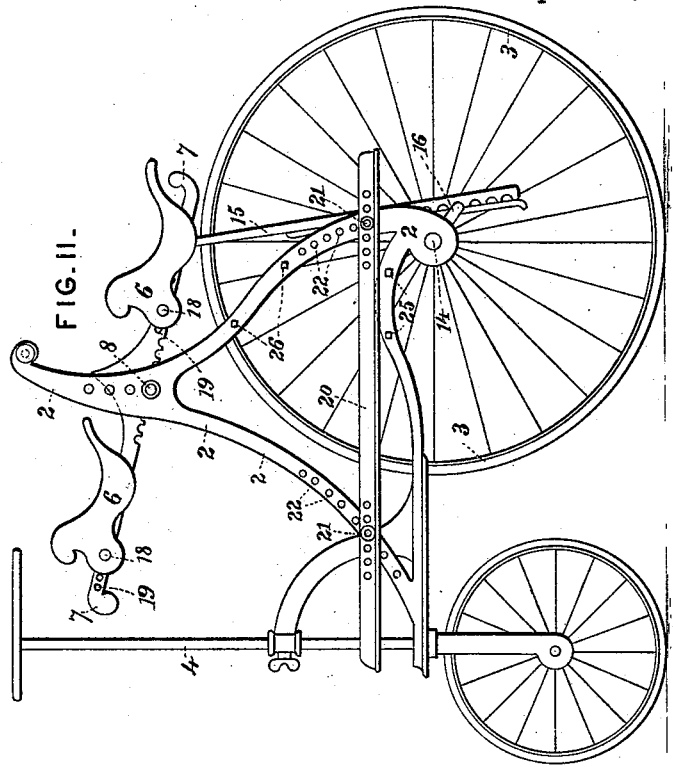
FIG. II.
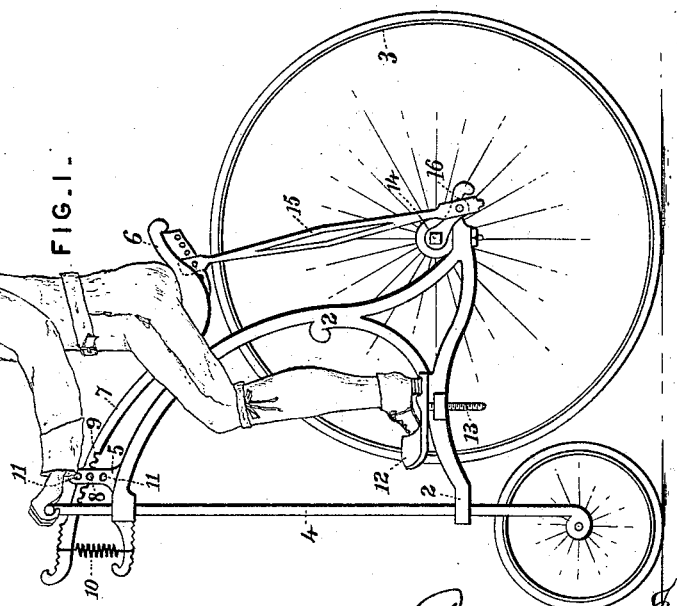
FIG. I.
Attest:
Geo. T. Smallwood.
Philip Mauro
Inventor:
Camillo Kramer by
J. Pollok
his attorney.

(No Model.) 2 Sheets—Sheet 2.
C. KRAMER
VELOCIPEDE.
No. 361,530. Patented Apr. 19, 1887.
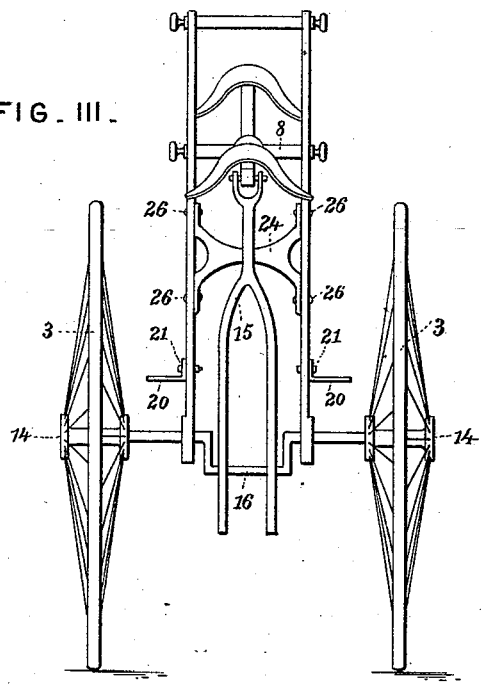
FIG. III.
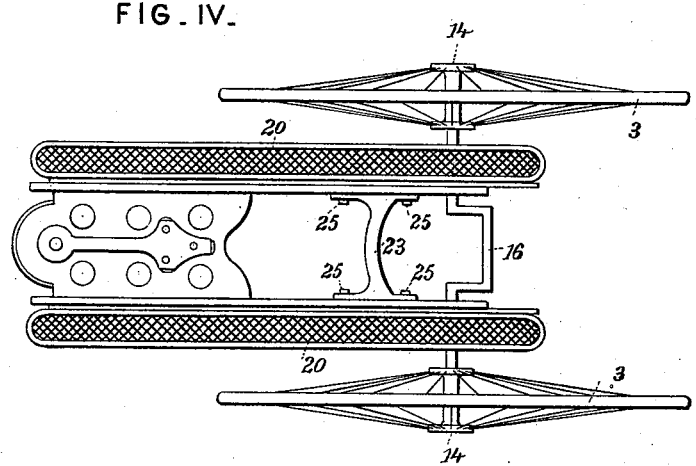
FIG. IV.
Attest:
Geo. T. Smallwood.
Philip Mauro
Inventor:
Camillo Kramer
By J. Pollok
his atty

United States Patent Office.

CAMILLO KRAMER, OF ALBANY, NEW YORK.

VELOCIPEDE.

SPECIFICATION forming part of Letters Patent No. 361,530, dated April 19, 1887.

Application filed January 21, 1887. Serial No. 225,011. (No model.)

*To all whom it may concern:*

Be it known that I, CAMILLO KRAMER, of Albany, in the county of Albany and State of New York, have invented a new and useful Improvement in Velocipedes, which improvement is fully set forth in the following specification.

This invention has reference to velocipedes or vehicles propelled by the person or persons riding thereon, and particularly to that class of vehicles in which the power for propulsion is derived from the motion of the saddle or seat, the feet and hands of the rider being stationary.

The invention may also be applied to propelling boats, running light machinery, and to other purposes. Many attempts have been made heretofore to produce velocipedes working on this principle; but, so far as I am aware, such attempts have not resulted in the production of a practical and successful road-vehicle capable of competing with velocipedes of the ordinary types.

Evenness and ease of motion are necessary to the successful working of a velocipede, and it has heretofore been found difficult or impossible to secure these advantages in vehicles of the class referred to.

According to the present invention the seat or saddle is carried by an arm or support pivoted to the frame of the vehicle in such manner that the seat may oscillate in an arc whose chord is vertical, or nearly so, and is connected with the driving-shaft by a crank and pitman or equivalent driving mechanism. With such an apparatus the motion of the rider would not ordinarily be uniform or even, since the ascent of the seat would be attended with much greater difficulty and effort than the descending motion.

According to the present invention the arm or support is extended beyond its fulcrum, and a counter-balance, which may be a weight or a spring, is provided on the end thereof. With this arrangement, when a proper adjustment is secured, the motion of the rider, particularly at high speeds, is practically uniform.

The device may be designed for two or more riders, the seats being on opposite sides of the fulcrum of the seat, the operation being similar to a seesaw. In this case the weight of one rider counterbalances that of the other.

In order that the best results may be secured, the seat is so pivoted that it can be adjusted horizontally to secure a perfect balance. The counter-weight or spring also is or may be adjustable. The improvements may be embodied in a velocipede having two or any greater number of wheels.

In the accompanying drawings, which form a part of this specification, Figure I is a side view of a velocipede constructed in accordance with the invention, one of the driving-wheels being removed; Fig. II, a similar view of a somewhat different embodiment of the invention; Fig. III, a plan view of the foot-rest and a portion of the frame, and Fig. IV a rear view of the upper part of the vehicle.

In Fig. I the frame 2, which may be a metal casting or be formed of any other suitable material—such as wood, or part of wood and part metal—has suitable bearings for the axle of the driving wheel or wheels 3 and for the steering-rod 4. On the upper part of the frame 2 are uprights or supports 5 for the seat or saddle 6. The latter is at the end of an arm or lever, 7, loosely supported on a fulcrum-pin, 8, carried by the supports 5. This pin may be inserted in any one of the holes 11 in the uprights 5, and the seat thus raised or lowered, as required. As shown, the arm or lever 7 has a number of grooves, 9, on the under side, any one of which can be placed upon the journal-pin 8. The seat can thus be readily shifted back and forth, as may be required. The supporting arm or lever 7 projects out beyond the fulcrum, and is at its end connected by a tension-spring, 10, with the frame 2, which is also extended out beyond the steering-rod. This spring acts as a counterbalance to the weight of the rider, and in order to adjust the force of the spring to the weight of different riders the spring can be moved toward or away from the fulcrum, the edge of the lever and of the frame being serrated, as shown, to hold the spring 10 in its proper position.

The foot-rest 12 is or may be adjustable vertically. As shown, it is carried by a screw, 13, which enters a threaded socket in the frame.

Motion is conveyed to the driving-shaft 14 by a pitman or connecting-rod, 15, pivoted to the under side of the bar or lever 7 and connected with a crank, 16, on the driving-shaft 14. There are several holes in the lever 7 for the pin that connects the pitman 15 therewith, so that the latter can be adjusted when necessary—as, for instance, when the height of the lever 7 is shifted. The location of the pitman with reference to the crank-shaft and to the position of the rider is designed to secure the most effective application of the motive power, the motion of the pitman at its upper end being practically in a line radial to the axis of the shaft 14.

It is obvious that in place of the spring 10 a weight may be employed as a counterpoise. Thus the velocipede shown in Figs. II, III, and IV is adapted to hold two riders, the weight of one balancing that of the other. As shown in these figures, there are two seats, 6, one on each end of the oscillating lever 7. As in Fig. I, the fulcrum-pin 8 is adjustable vertically and the lever 7 is adjustable horizontally; or the same end may be secured by adjusting the seats on the lever, by setting the holding-pin 18 of the seats in any one of the holes 19 in the supporting-lever 7. A spring should be interposed between the seat and lever.

The foot-rest 20 extends the full length of the vehicle, as in my Patent No. 355,324, granted January 4, 1887. It is adjustable vertically with reference to the frame by setting the holding screws or bolts 21 in any of the holes 22. The frame 2 is strengthened by braces 23 24, secured by screws and nuts 25 26.

The pitman or connecting-rod 15 is preferably of the construction described in my patent aforesaid.

Obviously my improvements may be applied to velocipedes having two steering-wheels and one driving-wheel, or velocipedes having any desired number of wheels, and the velocipede may be adapted to carry more than two riders.

Other modifications may be made without departing from the spirit of my invention.

I claim as my invention—

1. The combination, with the frame and the driving-shaft, of an arm or lever fulcrumed on the frame and pivoted so that the ends of said lever oscillate vertically, a seat carried by one end of said arm or lever, means for counterbalancing the weight of the seat and rider, and a pitman or driving-rod connecting said shaft and lever, the said pitman or rod being approximately in line with the direction of oscillation of said seat, substantially as described.

2. The combination, with the driving-shaft, of the arm or lever connected with said shaft and the fulcrum-pin on which said lever oscillates, the latter being adjustable horizontally with reference to said pin, substantially as described.

3. The combination of the driving-shaft, the vertically-oscillating arm or lever for operating the same, the vertically-adjustable fulcrum-pin therefor, and the horizontally-adjustable seat or seats carried by said arm or lever, substantially as described.

4. The combination of the arm or lever fulcrumed near its center, a seat on each end of said lever, operating-connections between said lever and the driving-shaft, and a foot-rest extending around the sides of the vehicle, substantially as described.

In testimony whereof I have signed this specification in the presence of two subscribing witnesses.

CAMILLO KRAMER.

Witnesses:
PHILIP MAURO,
C. J. HEDRICK.